J. F. ALLEY.
GROCER'S CABINET.
APPLICATION FILED DEC. 28, 1915.

1,205,695.

Patented Nov. 21, 1916.
6 SHEETS—SHEET 2.

WITNESSES
L. Hauerstein
C. Bradway

INVENTOR
J. F. Alley
BY Munn & Co
ATTORNEYS

J. F. ALLEY.
GROCER'S CABINET.
APPLICATION FILED DEC. 28, 1915.

1,205,695.

Patented Nov. 21, 1916.
6 SHEETS—SHEET 5.

WITNESSES

INVENTOR
J. F. Alley
BY
ATTORNEYS

UNITED STATES PATENT OFFICE.

JOHN F. ALLEY, OF NEW YORK, N. Y.

GROCER'S CABINET.

1,205,695.  Specification of Letters Patent.  Patented Nov. 21, 1916.

Application filed December 28, 1915. Serial No. 69,107.

*To all whom it may concern:*

Be it known that I, JOHN F. ALLEY, a citizen of the United States, and a resident of the city of New York, borough of Brooklyn, in the county of Kings and State of New York, have invented a new and Improved Grocer's Cabinet, of which the following is a full, clear, and exact description.

This invention relates to grocers' cabinets for dispensing and weighing commodities.

The invention has for its general objects to improve and simplify the construction and operation of apparatus of the character referred to so as to be reliable and efficient in use, comparatively inexpensive to manufacture and keep in operative condition, and so designed as to hold a large number of commodities in a comparatively small space.

A more specific object of the invention is the provision of a cabinet having a plurality of separate compartments and chutes for the various commodities, each chute having a novel arrangement of valve mechanism operable by the pressing of a key, and adapted to be electrically released when the scale of the apparatus weighs the amount of commodity desired.

A further object of the invention is the provision of a novel form of weighing hopper mounted on the platform or beam of a scale and associated with discharge spouts of the various compartments so as to receive material therefrom, and in the hopper is a valve for releasing the material through a funnel into a bag held to receive the material.

Futhermore, the invention has for an object the provision of a novel device adjustably mounted in the hopper and so related to the discharge spouts of the compartments that the material being discharged from a spout will back up or have a retarded flow to enable the valve means of the spout to arrest the flow when the hopper receives the required weight of material, so that an overflow or over weight will not be discharged into the hopper to the economic loss to the storekeeper, and the said device has means which is manually opened so as to permit the weighed material to discharge out of the funnel or spout of the hopper into a bag.

Another specific object of the invention is the employment of a novel switch for controlling the circuit of the electrical means, whereby the locks for the various operating keys are released when the predetermined weight of material has discharged into the weighing hopper.

With such objects in view, and others which will appear as the description proceeds, the invention comprises various novel features of construction and arrangement of parts which will be set forth with particularity in the following description and claims appended hereto.

In the accompanying drawings which illustrate one embodiment of the invention and wherein similar characters of reference indicate corresponding parts in all the views.

Figure 1:
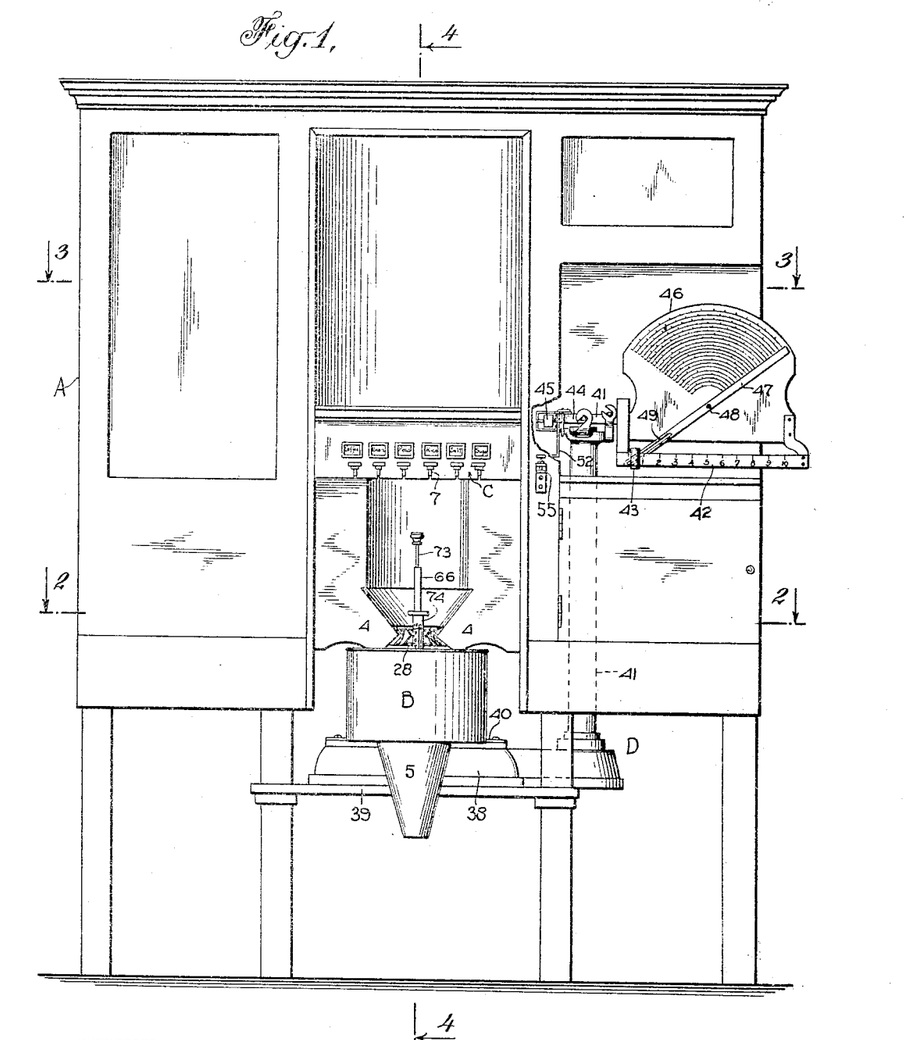
Figure 1 is a front view of the grocer's dispensing cabinet.
Figure 2:
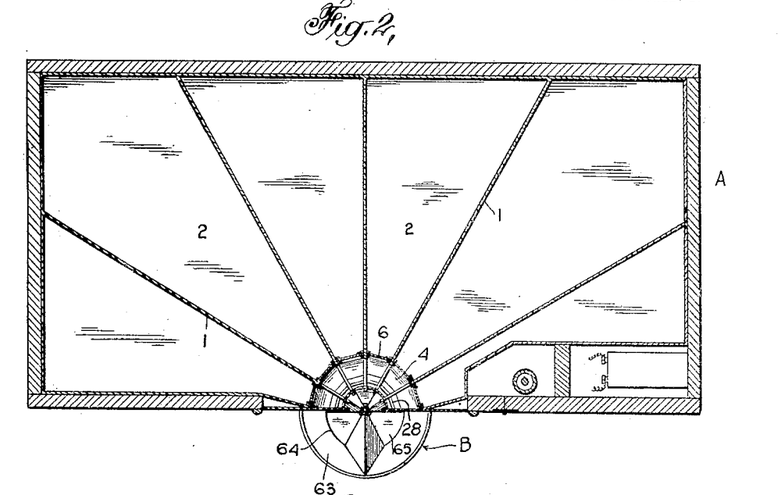
Figs. 2 and 3 are horizontal sectional views respectively on the lines 2—2 and 3—3, Fig. 1.
Figure 3:
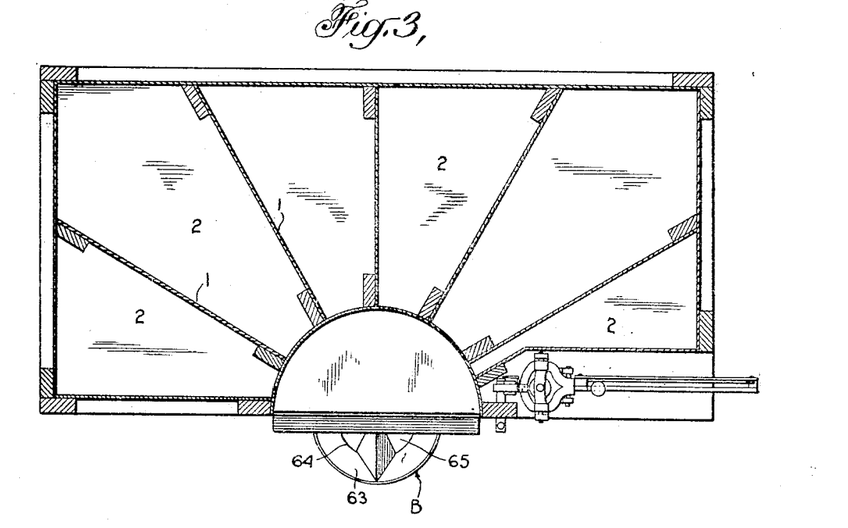
Figure 4:
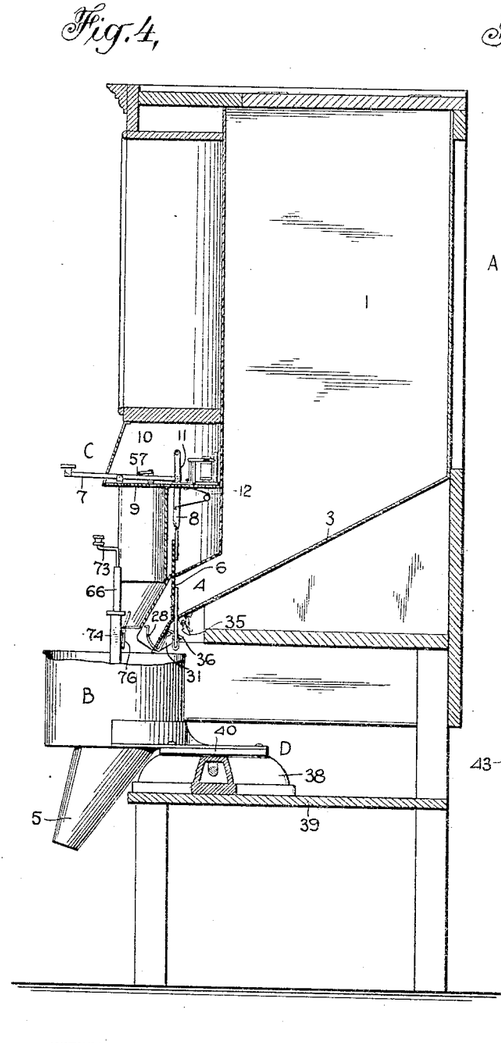
Fig. 4 is a central vertical sectional view on the line 4—4, Fig. 1.
Figures 5, 6:
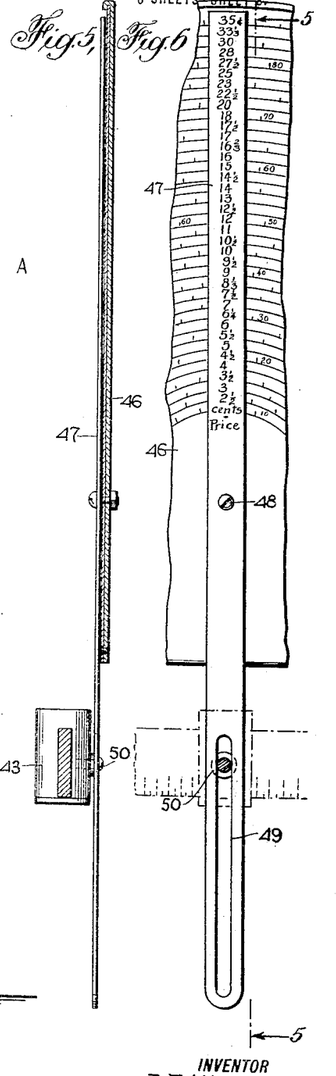
Fig. 5 is a sectional view of the dial portion of the weighing scale.
Fig. 6 is a front view of a portion of the dial and indicating hand of the scale.

Referring to the drawing, A designates the body of a cabinet which may be of any desired construction, and the interior is divided by vertical partitions 1 into a plurality of compartments 2. In the present instance only six compartments are shown, but any number may be employed. The bottoms 3 of the compartments slope downwardly as shown in Fig. 4, so that the material will gravitate more readily to the the discharge spouts 4. The discharge spouts are arranged around a common center, as clearly shown in Fig. 2, so as to empty into a weighing hopper B, which has a funnel-shaped spout 5 under which a bag or paper sack is adapted to be placed to receive the material that is dispensed and weighed.

Figures 7, 8, 9, 10:
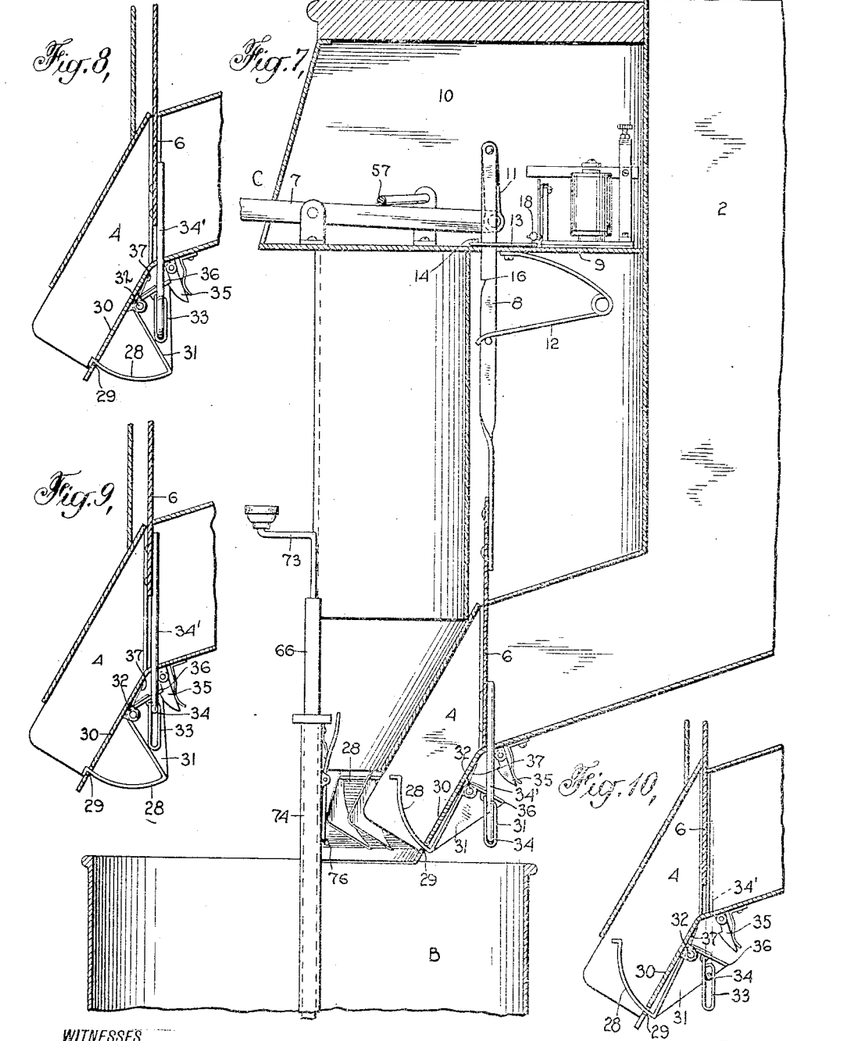
Fig. 7 is a detail sectional view of one of the compartments of the cabinet and the valve mechanism controlling the spout thereof.
Figs. 8, 9 and 10 are sectional views of a discharge spout showing the valves in different positions.
Figure 11:
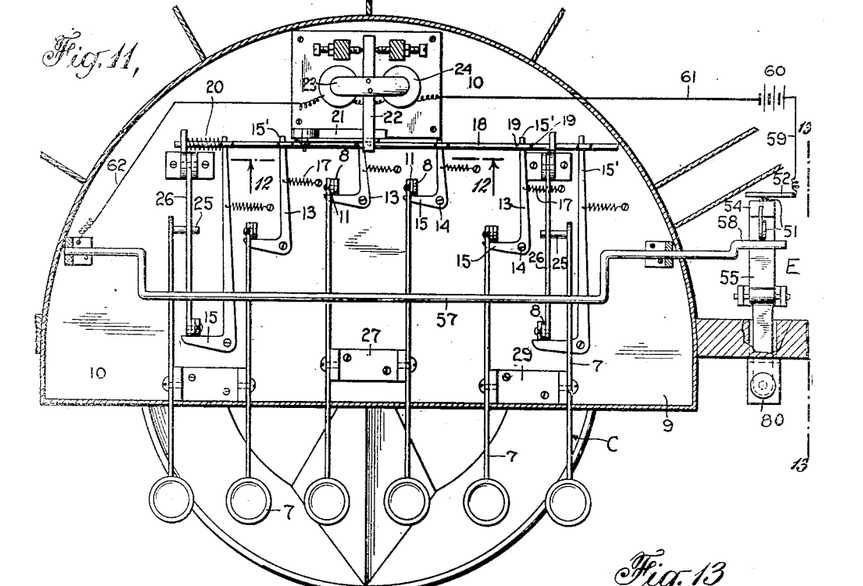
Fig. 11 is a horizontal section showing the operating keys for the various discharge valves.
Figure 12:
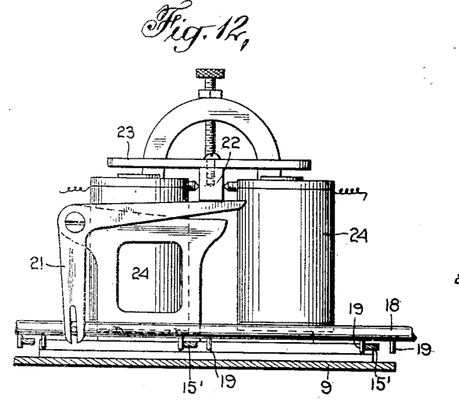
Fig. 12 is a vertical section on the line 12—12 Fig. 11, showing the electromagnet for releasing the locks that hold the valves open.

Above the hopper is arranged a bank of operating keys C which control the discharge valves, there being a discharge valve 6 in each spout 4, and each valve has an operating key 7. The valve is mounted to move vertically to and from an open position and extends across the spout 4, and being in the form of a plate it effectively serves as a cut-off. Connected with and extending upwardly from each valve 6 is a rod 8 which passes through the bottom 9 of a compartment 10 that contains the operating keys and the locking and releasing means therefor. Each rod 8 is connected by a link 11 with an operating key 7, and a spring 12 connected with the rod 8 serves to assist in restoring the gate or valve 6 to closed position. As shown in Figs. 7 and 11, each rod 8 has a lock 13 associated therewith for the purpose of holding the rod raised or in open-valve position, the lock being in the form of a bell-crank lever fulcrumed at 14 and having an arm 15 which is adapted to engage a recess or shoulder 16 in the rod 8 when such shoulder is raised to the level of its locking device 13. The device 13 has a rearwardly extending arm 15' that is acted on by a spring 17 in such a manner as to keep the arm 15 in engagement with the front edge of the adjacent rod 8, so that, as soon as the rod is raised, the arm 15 will catch under the shoulder 16. The locking levers 13 are adapted to be released by a common releasing bar 18 which is mounted in the compartment 10 to move longitudinally, and the rear arms 15' of the locking levers are operatively connected with the bar 18 by means of pairs of pins 19 between which the lever arms 15' engage. The releasing rod 18 has a spring 20 which urges the rod to the right in Fig. 11, and by pulling the rod to the left the locking levers 13 are thrown to releasing position so that that rod 8 which is in raised or in open-valve position will be permitted to drop. The releasing rod 18 is actuated by a bell-crank lever 21, Fig. 12, which has one arm disposed under a lever 22 that carries an armature 23 of electromagnets 24. This electromagnetic operating device is adapted to be energized by the closing of a circuit when some moving part of the scale has reached a position corresponding to the balanced condition of the platform, whereby the open discharging valve will be automatically closed and cut off the further flow of material to the weighing hopper.

The discharge valves 6 are disposed in a circular line around a common point, and the rods 8 that are connected therewith are also arranged around a common center, as shown in Fig. 11, and as a consequence the outermost keys are not directly connected with the rods 8 but are each provided with a pin 25 that engages under a lever 26 that is connected with the associated valve operating rod 8. The keys 7 are disposed in pairs and fulcrumed on supporting blocks 27, and the length of the keys and their fulcrum points are so arranged that the keys will operate at substantially the same pressure. The keys are returned to normal position after being depressed by the springs 12 connected with the bars 8.

A secondary or cut-off valve 28 is disposed below the valve 6 and is adapted to catch the excess material that flows out of the spout during the time the main valve 6 is closing, it being understood that the main valve closes by reason of the weighing scales. The valve 8 moves upwardly through an opening 29 in the bottom of the chute 30, and it is carried by an arm 31 that is fulcrumed at 32 under the spout. On the arm 31 is a slotted member or link 33 into the slot of which engages a pin or finger 34 on a rod 34' which depends from the valve 6, so that when the valve 4 is opened the valve 28 will move to open position, as shown in Fig. 8. The valve 28 is adapted to be yieldingly held in open position by means of a spring-pressed catch 35 arranged to engage a lip 36 on the arm 31, and the lip is engaged with the catch 35 by the arm 31 being raised through the agency of the finger 34 and link 33, as when the main valve 6 is raised. The valve 6 is raised to a higher point than it will be held open by its locking lever 13 engaging the shoulder 16, and after the catch 35 engages the lip 36, the operating key 7 is released so that the valve 6 will move downwardly from the position shown in Fig. 9 to that shown in Fig. 8, thereby allowing the material to flow out from the compartment which has been opened. When the hopper weighs the required amount of material, the open valve is released, and during the first part of its movement the finger 34 engaging the bottom of the link 33, as in Fig. 8, causes the lip 36 to disengage from the catch 35, and the valve 28 moves closed, there being a coiled spring 37 on the fulcrum pin 32 of the valve-carrying arm 31.

The hopper B is mounted on a weighing scale D which has its base 38 supported on a shelf 39 of the cabinet, and the platform 40 of the scale has a hopper B fastened thereto. Rising from the base is the usual column 41 that contains the operating connection between the platform 40 and the beam 41, which beam has a main arm 42 on which slides the balance or poise 43, and on the other arm 44 is a counter-balance weight 45. On the scale-bearing arm 42 is a dial 46 over which moves a hand or indicator 47 fulcrumed at 48 and having its lower extremity provided with a slot 49 which is connected by a pin 50 with the weight or poise 43, whereby the movement of the latter on the scale-bearing arm 42 will cause the indicator 47 to move over the dial 46, to thereby enable the storekeeper or customer to readily determine the price of the material being dispensed.

Figure 13:
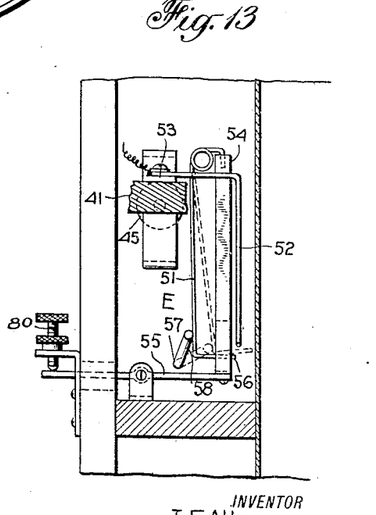
Fig. 13 is a vertical sectional view on the line 13—13, Fig. 11, showing the switch for the electromagnet circuit.

The switch E is located behind the short arm of the beam 41, and it comprises two contacts 51 and 52, the latter being fastened at 53 to the scale beam 41, and the former being mounted on the upper end of a post 54 which is fastened to the rear end of an adjusting lever 55. The contact 51 is a spring wire which has its lower or free end formed into a lateral member 56 which is normally disposed out of the plane of the contact 52, which latter contact moves downwardly with the scale beam when the desired amount of material has been weighed. The contact 51 is thrown laterally so that the member 56 will be in the path of the contact 52 when a key is depressed. This operation is produced by a crank bar 57 which overlies the operating keys 7, and on one extremity of the bar 57 is a crank 58 which engages in front of the contact 51 so as to move the latter from the full to the dotted-line position, Fig. 13, when a key is pressed. When the contact 51 is in the dotted line position, Fig. 13, and the scale beam tilts, the contact 52 engages the contact 51 and closes the circuit, so that the electromagnet 24 will be energized to effect the release of the discharge valve that has been opened. The circuit comprises a wire 59 which is connected with the contact 52, a cell or battery 60, a wire 61, electromagnet 24, wire 62, crank or actuating bar 57, and contact 51, which is engaged by such bar. As soon as the electromagnet is energized the open valve closes and simultaneously the key 7 connected therewith returns to normal position, so that the crank bar 27 will gravitate to normal position and thereby permit the contact 51 to move from the dotted-line to the full-line position, Fig. 13.

Figures 14, 15, 16, 17:
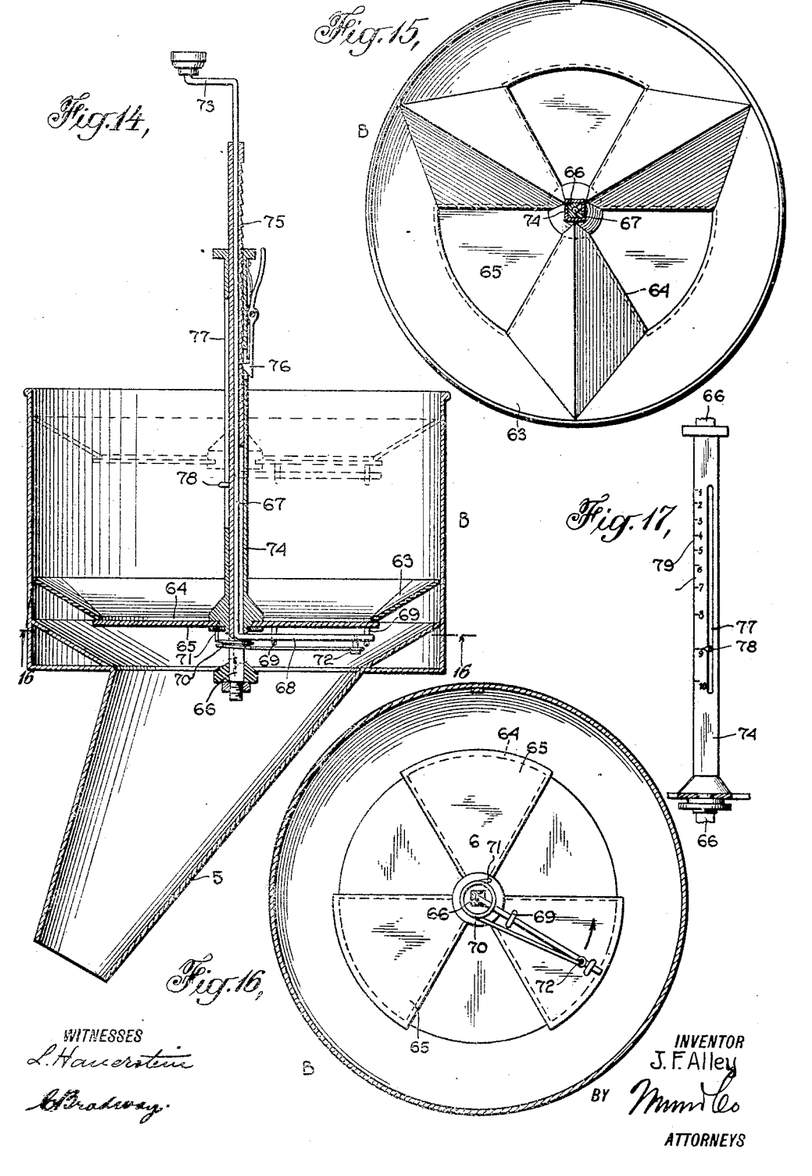
Fig. 14 is a vertical section of the weighing hopper.
Fig. 15 is a plan view of the weighing hopper.
Fig. 16 is a horizontal section on the line 16—16, Fig. 14.
Fig. 17 is a detail view of the index tube connected with the adjustable false bottom of the hopper.

The hopper B is provided with a false bottom 63 which has spaced openings 64 disposed around a common center, and these are closed by sector-shaped plates 65 forming a rotary valve. A vertical stationary post 66 passes upwardly through the false bottom, and in this post is a shaft 67 that has at its lower end an arm 68 disposed under the rotary valve, and this arm is connected with one of the plates of the valve by apertured lugs 69. A coiled spring 70 is disposed around the lower end of the post 66 and has one end anchored at 71, and the other end connected at 72 with the rotary valve so as to maintain the same in closed position. The upper end of the shaft 67 has an operating crank or handle 73 whereby the valve can be opened. The false bottom 63 is movable longitudinally of the hopper and is adapted to be held in any desired position therein. For this purpose the false bottom has a tubular member 74 slidable on the post 66, and on the post are ratchet teeth 75 with which a spring-pressed pawl 76 on the member 74 is adapted to engage to lock the false bottom in different positions of adjustment. The tubular member has a longitudinal slot 77 through which extends a pointer 78 fixed on the post 66, and along the slot is a scale 79 with which the pointer 78 coöperates to enable the user to adjust the false bottom to the required position. The object of making the false bottom adjustable is to control the rate of flow of the material out of any of the discharge spouts. When a small quantity of material is to be weighed, the false bottom is raised to the desired point, and the material piles up on the false bottom and finally backs up or flows at a retarded rate down the discharge spout 4, which is open. This enables the cut-off valve 28 to close and abruptly cut off the flow of material from the discharge spout when the desired weight of material has been delivered to the hopper. The rotary valve of the false bottom is now opened so that the material can flow into a bag which is held under the spout 5 of the hopper.

To effect a very fine adjustment of the dispensing mechanism to insure accurate weighing, the screw 80 can be manipulated to adjust the lever 55, whereby the circuit closing contacts 51 and 52 will engage at the proper time to effect the closing of the valves when the scale weighs the desired weight of material delivered to the hopper.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A grocer's dispensing cabinet divided into compartments for holding bulk material, a discharge spout connected with each compartment, a weighing hopper into which the spouts discharge, valve means controlling the discharge of material from the spouts, and means within the hopper adjustable toward and from the spouts for catching the material delivered therefrom.

2. In a grocer's dispensing cabinet, the combination of a plurality of compartments, each having a discharge spout, a valve mechanism for each spout to control the flow of material therethrough, a hopper into which the spouts discharge, and an adjustable bottom in the hopper movable toward or from the spouts according to the amount of material desired to be dispensed.

3. In a grocer's dispensing cabinet, the combination of a plurality of dispensing spouts, a hopper having a spout in its bottom, a false bottom disposed in the hopper and adjustable toward and from the dispensing spouts and including an opening, and a valve controlling the opening.

4. A cabinet of the class described including a plurality of dispensing devices, a hopper into which the devices are adapted to discharge, a post in the hopper, a false bottom movable along the post and having an opening, a valve normally closing the opening, and means supported by the post for manually opening the valve.

5. The combination of a plurality of dispensing means, a hopper into which said means discharge, a fixed post in the hopper, a false bottom disposed in the hopper and having a plurality of openings, a tubular member connected with the false bottom and slidable longitudinally on the post, a rotary valve for the openings of the false bottom, means for yieldingly holding the valve in closed position, and means operatively connected with the valve and slidable in the post for permitting the valve to be manually opened.

6. The combination of a plurality of dispensing means, a hopper into which said means discharge, a fixed post in the hopper, a false bottom disposed in the hopper and having a plurality of openings, a tubular member connected with the false bottom and slidable longitudinally on the post, a rotary valve for the openings of the false bottom, means for yieldingly holding the valve in closed position, means operatively connected with the valve and slidable in the post for permitting the valve to be manually opened, and a locking device between the said tubular member and post for holding the false bottom in different positions in the hopper.

7. The combination of a plurality of dispensing means, a hopper into which said means discharge, a fixed post in the hopper, a false bottom disposed in the hopper and having a plurality of openings, a tubular member connected with the false bottom and slidable longitudinally on the post, a rotary valve for the openings of the false bottom, means for yieldingly holding the valve in closed position, means operatively connected with the valve and slidable in the post for permitting the valve to be manually opened, a locking device between the said tubular member and post for holding the false bottom in different positions in the hopper, and indicating means for facilitating the adjustment of the false bottom.

8. The combination of a plurality of dispensing devices, a hopper into which the said devices discharge, a spout in the bottom of the hopper, a false bottom in the hopper, a post fixed in the hopper and having a plurality of teeth, a tubular member slidable on the post and connected with the false bottom, a pawl mounted on the tubular member and engageable with the teeth for holding the member and false bottom in different positions of adjustment, a shaft disposed in the post, said false bottom having openings, a valve for controlling the openings and connected with the said shaft, means for turning the shaft to open the valve, and spring means operatively connected with the valve for closing the same.

9. In a cabinet of the class described, the combination of a plurality of compartments for holding material to be dispensed, spouts connected with the bottoms of the compartments, main valves in the spouts, cut-off valves disposed in the spouts below the main valves, means operatively connecting the valves together, whereby they open simultaneously, means controlled by the first part of the closing movement of the main valve for closing the secondary valve quickly and before the main valve closes, and a device mounted in the hopper and movable toward and from the spouts.

10. In a cabinet of the class described, the combination of a plurality of compartments, a discharge spout for each compartment, a main valve in each spout, a secondary cut-off valve disposed in each spout below the main valve, means operatively connecting the valves together for opening the valves simultaneously, a yielding catch for holding the secondary valve open, a spring tending to close the secondary valve, and means for effecting the release of the secondary valve by the first part of the closing movement of the main valve, whereby the secondary valve is quickly closed before the completion of the closing movement of the main valve.

11. In a cabinet of the class described, a dispensing spout, a main valve therein, a secondary valve below the main valve, a slot and pin connection between the valves, whereby the main valve in opening has an overtravel for moving the secondary valve to open position, a yielding catch for holding the secondary valve in open position while the main valve moves back through its overtravel, a lock for holding the main valve open, means tending to close the main valve, a device for releasing the lock to permit the main valve to move to closed position and in moving to release the said catch, and means for closing the secondary valve when the catch is released.

12. In a dispensing cabinet, a discharge spout, a main valve extending across the spout and movable upwardly to open position, a secondary valve extending into the spout through the bottom thereof and located below the main valve, a pivoted arm on the spout and on which the secondary valve is carried, a slotted link connected with the arm, a member fastened to the main valve and having a finger extending into the slot in the said link, a yielding catch arranged to engage the arm to hold the secondary valve open, said main valve being adapted to have an overtravel, whereby the arm is engaged with the catch, and being adapted to release the arm from the catch by the first part of the closing movement, means for quickly closing the secondary valve before the closing movement of the main valve is finished, and means for actuating the main valve.

13. A dispensing cabinet including a plurality of compartments having discharge spouts, valves for controlling the spouts, keys connected with the valves for operating the same, locks for holding the valves open, a device operative to release all the locks, and electrical means for operating said device.

14. A dispensing cabinet including a plurality of compartments having discharge spouts, valves for controlling the spouts, keys connected with the valves for operating the same, locks for holding the valves open, a device operative to release all the locks, a weighing hopper into which the spouts discharge, electrical means for operating the said device to permit any open valve to close, and a circuit closer automatically closed when the weighing hopper has received the desired amount of material, whereby the open valve is automatically closed.

15. A cabinet having a plurality of compartments, a hopper into which the compartments discharge, valves controlling the flow of material from the compartments into the hopper, a weighing scale supporting the hopper, manual means for opening the valves, automatically set locks for holding the valves open, electrical means for releasing the locks, and a circuit controller for the electrical means including an element actuated by a moving part of the scale, whereby the open valve will automatically close when a predetermined weight of material has been supplied to the hopper.

16. In a dispensing cabinet, the combination of a plurality of spouts, a valve for each spout, a member connected with each valve and having a shoulder, a spring-pressed lock associated with each member and arranged to engage the shoulder thereof when the valve is opened, a device common to all the locks for releasing the same, means for independently opening the valves, and electrical means for actuating the device.

17. In a dispensing cabinet, the combination of a plurality of spouts, a valve for each spout, a member connected with each valve and having a shoulder, a spring-pressed lock associated with each member and arranged to engage the shoulder thereof when the valve is opened, a device common to all the locks for releasing the same, means for independently opening the valves, electrical means for actuating the device, a circuit for the said electrical means, a circuit closer, and a weighing device for actuating the circuit closer when a predetermined weight of material is discharged from an open spout, whereby the closing of the circuit controls the closing of the open valve.

18. A dispensing cabinet including material-holding compartments, a weighing hopper receiving material from any compartment, valve means controlling the flow of material, a scale connected with the hopper for weighing material therein, and electrical means controlling the closing of the said valve means, said electrical means including a movable contact connected with a movable part of the scale and an adjustable contact movable with respect to the first-mentioned contact.

19. A grocer's cabinet including a plurality of material-holding compartments, a valve device for each compartment to control the outflow of material therefrom, a hopper into which the material flows, a scale connected with the hopper for weighing the material therein, a contact connected with the movable part of the scale, a second contact arranged to be engaged by the first-mentioned contact when the required amount of material is weighed, an electric circuit in which the contacts are included and containing means for controlling the closing of the valve device, a carrier for the second-mentioned contact, and means for adjusting the carrier to adjust the relation of the contacts for causing the valve device to close in proper relation to the balancing of the scale.

20. A dispensing cabinet including a plurality of compartments for holding material, a spout in each compartment, a valve in each spout, a key for opening each valve, a lock for holding each valve open, a device for releasing the locks, electrical means for actuating the device, a weighing means, and a circuit closer including a movable element moved by the weighing means to close the circuit of the electrical means and thereby cause the closing of the open valve.

21. In a dispensing cabinet, the combination of a plurality of independent compartments having dispensing spouts, a valve in each spout, a key for operating each valve, a lock for holding each valve open, a device for releasing the locks, electrical means for actuating the device to permit any open valve to close, a weighing device for weighing the material dispensed, a circuit closer having a movable contact element connected with the weighing means to move to closed circuit position thereby and including a contact element normally out of the path of the first element, and a device actuated by the operation of any key for moving the last-mentioned contact element into the path of the first-mentioned contact element.

22. A grocer's cabinet comprising a body divided into separate compartments, spouts at the bottom of the compartments and grouped around a common center, a weighing hopper disposed under the spouts, valves for the spouts, and a key mechanism including a bank of keys disposed above the spouts and operatively connected with the valves for actuating the same.

In testimony whereof I have signed my name to this specification in the presence of two subscribing witnesses.

JOHN F. ALLEY.

Witnesses:
C. BRADWAY,
G. H. EMSLIE.